(No Model.) 6 Sheets—Sheet 1.

H. H. UNZ.
TYPE WRITING MACHINE.

No. 400,146. Patented Mar. 26, 1889.

Fig. 1.

WITNESSES: INVENTOR, (No Model.) 6 Sheets—Sheet 2.

H. H. UNZ
TYPE WRITING MACHINE.

No. 400,146. Patented Mar. 26, 1889.

WITNESSES:
INVENTOR (No Model.) 6 Sheets—Sheet 3.

H. H. UNZ.
TYPE WRITING MACHINE.

No. 400,146. Patented Mar. 26, 1889.

WITNESSES:

INVENTOR (No Model.) 6 Sheets—Sheet 6.

H. H. UNZ.
TYPE WRITING MACHINE.

No. 400,146. Patented Mar. 26, 1889.

UNITED STATES PATENT OFFICE.

HENRY H. UNZ, OF PHILADELPHIA, PENNSYLVANIA.

TYPE-WRITING MACHINE.

SPECIFICATION forming part of Letters Patent No. 400,146, dated March 26, 1889.

Application filed March 14, 1887. Serial No. 230,767. (No model.)

*To all whom it may concern:*

Be it known that I, HENRY H. UNZ, of the city and county of Philadelphia, State of Pennsylvania, have invented a new and useful Improvement in Type-Writing Machines, of which the following is a true and exact description, due reference being had to the accompanying drawings, which form a part of this specification, in which—
Fig. 1$^a$, a portion of the rack, showing slotted holes;
(In Figs. 9 and 12 the pitch-circle of the ratchet-wheel is shown in dotted lines;) Fig. 13, plan view of machine, partly in section;
Fig. 17, rear view of machine with a portion of the main frame lifted;
Fig. 18, adjustable lug;
Figs. 19 and 19$^a$, perspective view of scale and double pointer;
Fig. 20, end view of main frame of machine;
Fig. 21, view showing mechanism for operating the bell;
Fig. 22, section of portion of main frame on line 7 8, Fig. 17, showing spring-socket for ribbon-spool;
Fig. 23, detail of adjustable bell-trip and drum-stop.

Similar letters denote similar parts.

Figure 13:
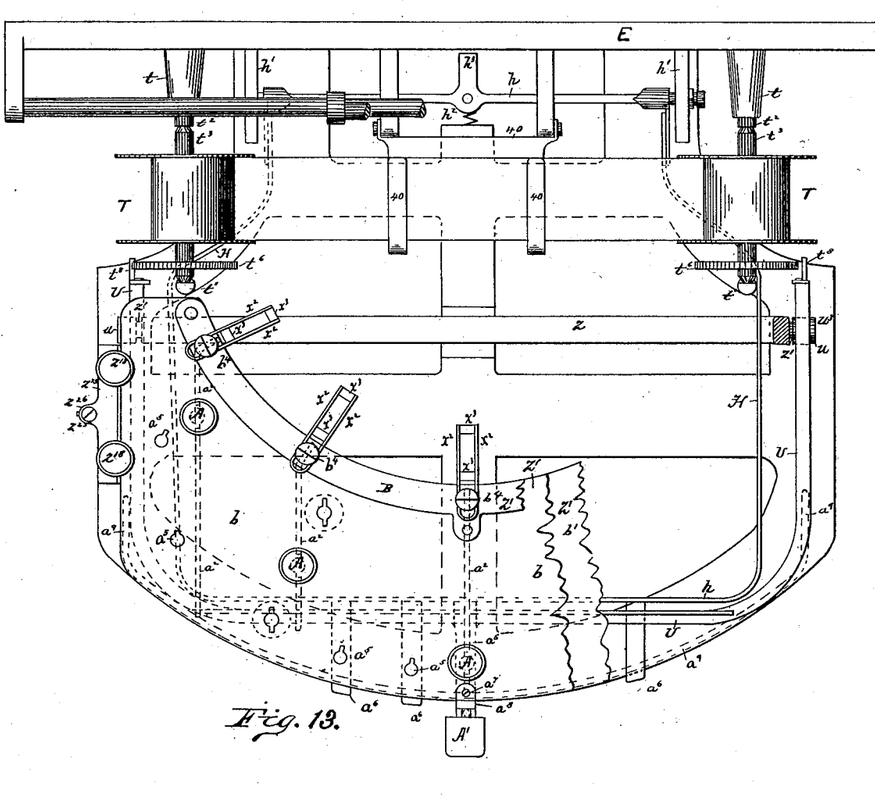
Figures 29, 30, 31, 32, 33:
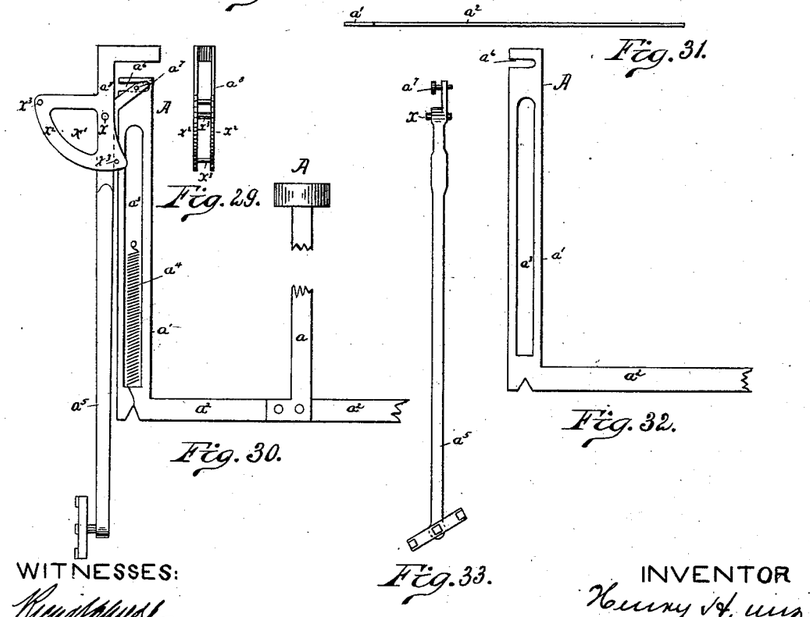
Fig. 29, end view of type-bar hanger and guide.
Fig. 30, type-operating key and type-bar hanger and type-bar combined.
Fig. 31, plan view of the middle type-operating key.
Fig. 32, side elevation of portion of type-operating key.
Fig. 33, front view of type-bar.

A are the type-operating keys. These type-operating keys have two vertical arms, $a$ $a'$, in the same vertical plane, and these arms are connected together by the rod or bar $a^2$. The arms $a$ of the finger-keys are arranged in any desired manner upon the operating-board, and are shown in plan view, Fig. 13, arranged in arcs of circles. The arms $a'$ of the type-operating keys A are preferably constructed so that they shall point to a common center. The bars $a^2$, connecting the two arms of the type-operating keys A, are all of the same length, or approximately so, and parallel to each other; but the arms $a$ of the type-operating keys A are attached to these connecting-arms $a^2$ at different distances from the arms $a'$, as is shown in Figs. 13 and 30. The extension of the connecting bar or rod beyond the arm $a$ is for the purpose of operating the spacing mechanism and the ribbon-operating bar at about the same point.

Figure 1:
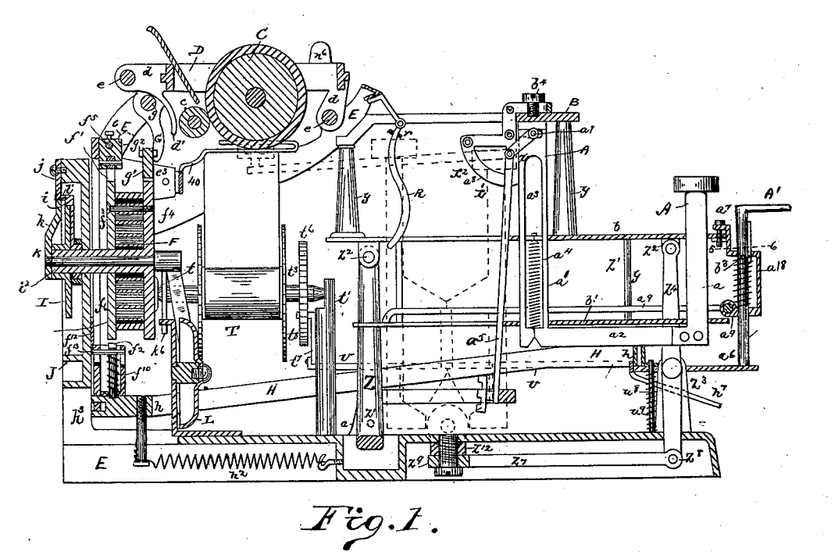
Figure 1 is a vertical section through the center of the machine.
Figure 1A:
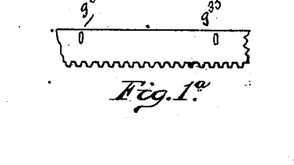

The arm $a'$ is constructed as shown in Fig. 32, and in the orifice $a^3$, which is cut out of the surface, is placed a spiral spring, $a^4$, said spiral spring being fixed at one end to the plate $b$, Fig. 1, and the other end to the finger-key A, Figs. 1 and 30. The type-bar $a^5$, having the desired type at its lower end, is connected with the type-operating key A by means of the arm $a'$, Figs. 1 and 30, of the type-operating key by being pivoted in the slot $a^6$, Figs. 1, 30, and 32, by the pivot or screw $a^7$, so that it is loosely and not rigidly joined thereto. This type-operating key A is preferably constructed by stamping the vertical arm $a'$ and the rod or bar $a^2$ in a single piece of metal, and the vertical bar $a$ is connected to said rod or bar $a^2$ at the desired point.

The type-bar hanger $a^8$, having a circular guide, $x^2$, is secured to the bar B, Figs. 1 and 13, by the screw $b^4$, and in this hanger and guide the type-bar is swung and guided during its movement to and from its impact point. When the operator presses the type-operating key, the type-bar is caused to move in an arc of a circle guided by the circular guide of the hanger, so as to impinge upon the platen at the proper point. The spring $a^4$, hereinbefore mentioned, assists the type-bar and type-operating key in returning to their normal position when the type-operating key is released. The type-operating keys are guided during this operation by the orifices in plates $b$ $b'$, Figs. 1 and 13.

In Fig. 1, C represents the platen, having the pressure-roller $c$, between which and the platen the paper rests. D represents the platen-carrier. This platen-carrier is attached to the rods $e$ of the main frame E of the machine by means of the bearings $d$, so that the platen-carrier can have a lateral motion along the rods $e$, but is held fast and prevented by said bearings from moving up and off of said main frame. The rods $e$ are secured to a pivotal portion of the main frame, to be hereinafter described.

Figures 14, 15, 16:
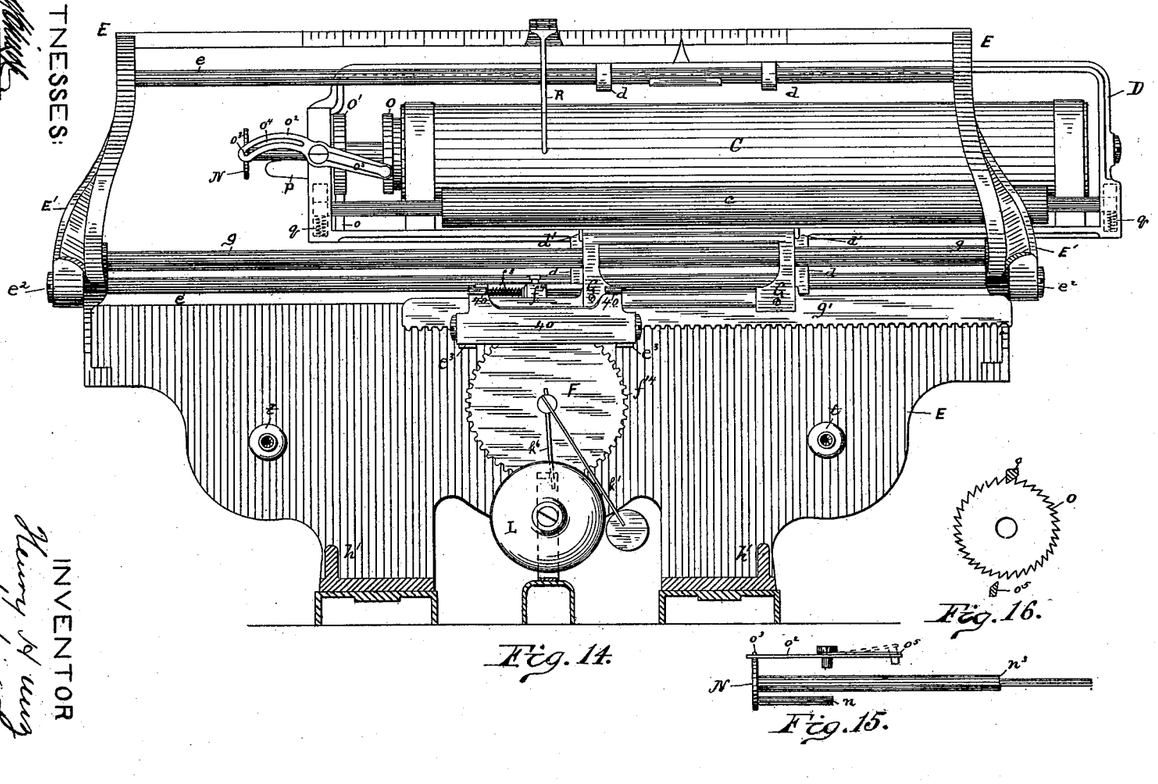
Fig. 14, inside view of rear portion of the main frame.
Fig. 15, side elevation of line-space plunger.
Fig. 16, end view of platen, showing holding-pawl engaged and driving-pawl disengaged.
Figures 17, 18, 19, 19A, 20, 21, 22, 23:
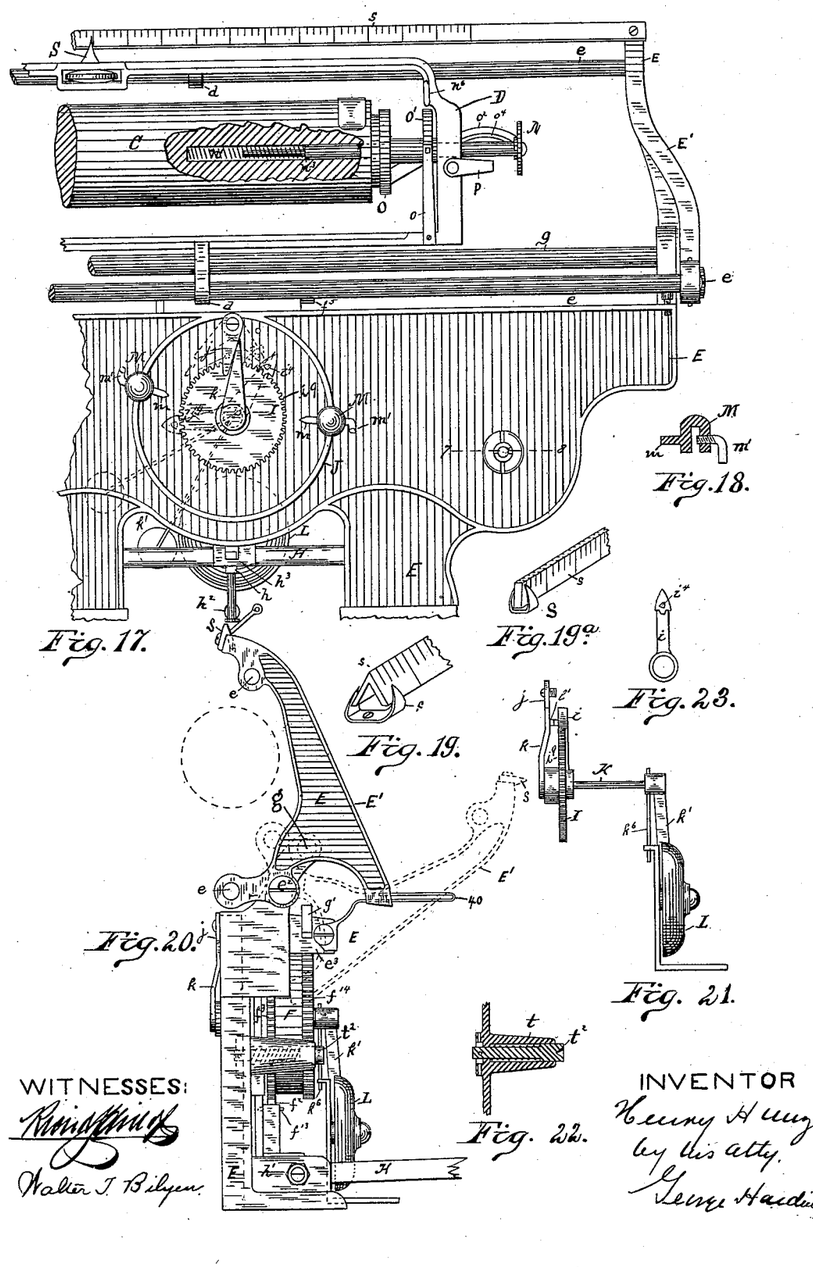

A portion, E', Figs. 14 and 20, of the main frame E is pivoted at $e^2$, so that that portion of the main frame can have a swinging motion. The platen-carrier D has attached to it a contact-arm, $d'$, which rests against the rack carrying platen-carrier-operating frame G. This travels along the rod $g$, (a portion of the main frame shown in Figs. 1 and 14.)

A rack, $g'$, is attached to the frame G by means of screws $g^2$ in slotted holes $g^{35}$ in said rack, so that the vertical movement may be given to this rack $g'$ by loosening the screws, the purpose of which will be hereinafter stated. The rack $g'$ works into the gear $f^{14}$ of the spring-impelled actuating-drum F. The spring in this drum causes the drum and gear to revolve, driving the rack forward, and this forward movement of the rack carries with it the frame G, which in turn moves the platen-carrier D forward. The rack $g'$ is guided in the bearings or lugs $e^3$, Figs. 1 and 20, of the main frame E. The arms $d'$ are so constructed that when the portion E' of the main frame E is swung, as heretofore described, the arms $d'$ are moved in the arc of a circle the center of which is $e^2$, and are always engaged or in contact with the frame G.

The arm $d'$ may be attached to the rack carrying the carrier-operating frame without affecting the result or method of operation.

The movement of the drum is controlled in such a manner that the platen-carrier is caused normally to travel a distance equal to the distance desired between letters, and this is accomplished by the following means: The action of the drum F is directly controlled by the two dogs $f'$ $f^2$, Figs. 9 and 12, alternately engaging with the ratchet-wheel $f^3$ of said drum F. The dog $f'$ is pivoted on the lug $f^4$. Said lug is adjustably attached by a set-screw to a rod, $f^5$, said rod being sustained in the frame $f^6$ by the lugs $f^7$. Around this rod is the spring $f^8$, in such a position that this spring is in compression when the dog $f'$ is engaged with the ratchet. The lower dog, $f^2$, is normally out of contact with the ratchet. The frame $f^6$ has a reciprocating motion, by which the dogs $f'$ and $f^2$ are alternately engaged and disengaged. These movements are actuated by the spacing-frame H. (Shown in Figs. 1, 13, and 17.) This spacing-frame has its front and rear ends $h$ parallel and in straight lines. This spacing-frame is supported by a pivotal connection with the support $h'$, and is normally held in position by the spring $h^2$, Figs. 1 and 13, which spring also retains the dog $f^2$ normally out of connection with the ratchet $f^3$, as shown in Fig. 1. The spacing-frame is connected to the vertical reciprocating sliding frame $f^6$ by means of the bifurcated projection $h^3$, Figs. 1, 13, and 17, at or near the center of the rear end of the spacing-frame in which the lower end of the frame $f^6$ rests.

The connecting-rod $a^2$ of the type-operating key, as has heretofore been stated, is made of sufficient length that its outer end will project beyond the outer end of the spacing-frame. When the operator depresses one of the type-operating keys, the connecting-rod $a^2$ depresses the spacing-frame $h$, which, acting upon the frame $f^6$, releases the upper dog, $f'$, causing the lower dog, $f^2$, to enter into the ratchet-tooth of the drum. When the operator releases the type-operating key, the dog $f^2$ is released and the drum revolves the distance equal to the distance between the ratchet-teeth, or the space of one letter. The spring $h^2$ causes the spacing-frame and the reciprocating vertical sliding frame $f^6$ to return to their normal position. The spring $f^8$ on the rod $f^5$ forces the rod a distance governed by the position of the lug $f^9$ on said rod, which is normally set a distance equal to the distance between the ratchet-teeth, and said dog $f'$ falls into the next ratchet-tooth from that which it formerly occupied, and is prevented, when operated by the drum, from moving more than its proper distance by the shoulder $l$ on the rod $f^5$.

In order to increase the power of the spring and the spring-actuated drum at any time, the screws $g^2$ of the rack $g'$ are loosened and the rack moved up vertically off of the gearing on the drum by means of the slots $g^{35}$ in the rack, hereinbefore mentioned. The drum is then released from the rack, and the tension of the spring in the spring-actuated drum is increased by revolving the drum by hand, or, preferably, by moving the rack, released from the gearing on the drum, any distance of its travel forward and then returning the rack into connection with the gearing on the drum and pushing the carrier and the rack connected with the drum back to their initial position, thus increasing the tension of the spring, the dog $f'$ preventing the drum from revolving when released from the rack. When the rack is moved off the gearing on the drum, as has just been described, the tension of the spring of the spring-actuated drum will be decreased by operating either any of the type-operating keys or the spacing-key.

Located at the front of the machine is a space-key, A'. This key (shown in Figs. 1 and 13) is an ordinary plunger, having a wing, $a^{10}$, (if the key be square this may be discarded,) to prevent its rotating. A spring surrounds the barrel of this key to hold it normally in position. The foot of this space-key rests upon one of the fingers $a^6$, projecting from the end of the spacing-frame. The spacing-key A' is held in the frame $a^8$, the upper end of which is secured to the upper plate, $b$, by the set-screw $a^7$, and the lower end is guided on the wire $a^9$, to which it may also be secured by a set-screw, if desired. When it is desired to move the spacing-key, the set-screw $a^7$ is released and the frame $a^8$, with the key A', is moved to the desired position on the machine. When it is desired to move the spacing-key A' within the surface of the plate $b$, especially at the extreme right or left of said plate, then the pin $b^3$ can be withdrawn (said pin limits the upward movement of the spacing-key) and key and spring removed and replaced in one of the orifices $a^5$, suitably formed in the plates $b$ and $b'$ and having fingers $a^6$ of the spacing-frame adjacent thereto, when necessary; but where the orifice is in such a position that the key when placed therein strikes the spacing-frame itself no finger is necessary.

When it is desired to move the platen-carrier forward the whole length of its travel, or any distance greater than one letter, it is accomplished in the following manner: The dog $f^2$ is so attached to the frame $f^6$ that it has a vertical movement, being retained in its normal condition by the spring $f^{10}$, Fig. 1. The spacing-frame is constructed as shown in Fig. 1, and the complete action of a type-operating-key or the spacing-key moves it a sufficient distance to cause the dog $f^2$ to engage the ratchet-wheel $f^3$, as heretofore described, and disengage the dog $f'$; but if the operator forces a further movement of the space-frame by pressure on one of the fingers $a^6$, preferably the center finger, the frame $f^6$ is caused to rise higher, and a projection, $f^{30}$, upon the reciprocating frame strikes the lever $f^{12}$, pivoted at $f^{20}$ upon the main frame, causing said lever to move on the pivotal support until it strikes the pin $f^{13}$ on the dog $f^2$, forcing the dog $f^2$ downward, and thus allowing the spring-actuated drum to act freely, as shown in Fig. 9, and the platen-carrier will be forced forward by said spring-actuated drum.

Attached to the vibratory spacing-frame H at or near the center of the front parallel bar, $h$, is an elastic buffer, $h^7$, which buffer projects below said spacing-frame, so that it strikes the main frame of the machine when the space or operating key is operated a sufficient distance to set the spacing mechanism in operation, thus indicating to the operator the end of the proper movement of the spacing or operating key to operate the spacing mechanism so as to cause the platen-carrier to move one letter-space and preventing an unintentionally too great movement of the spacing-frame.

Figures 2, 3, 4, 5, 6, 7, 8, 9, 10, 11, 12:
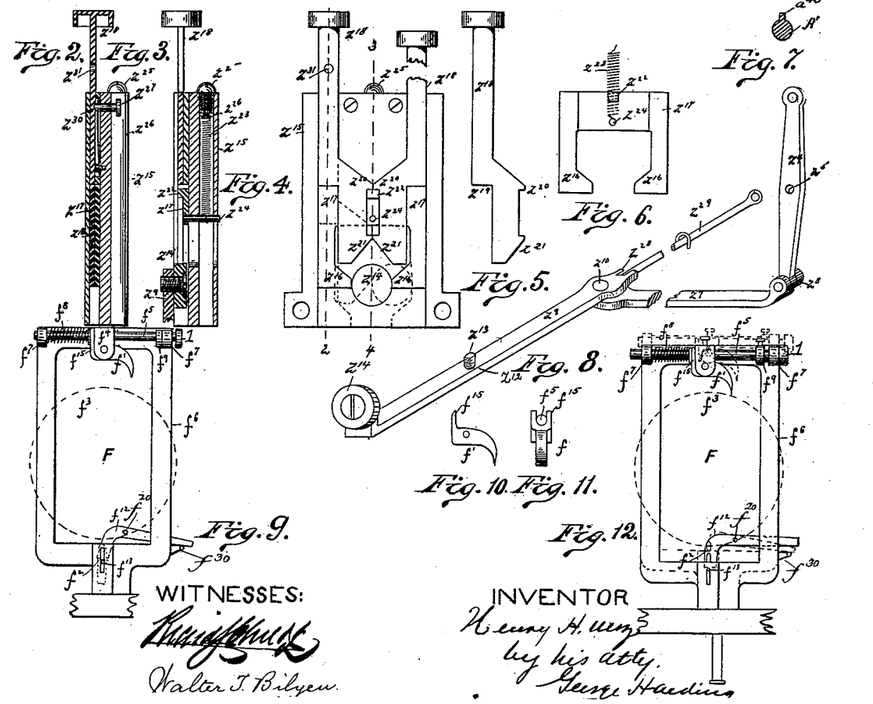
Fig. 2, a section of Fig. 4 on line 1 2.
Fig. 3, a section of Fig. 4 on line 3 4.
Figs. 4, 5, 6, and 8 show shifting mechanism of the vibratory frame.
Fig. 7, a section of adjustable spacing-key on line 5 6, Fig. 1.
Fig. 9, front view of the vertical reciprocating sliding dog-carrying frame in its raised position.
Figs. 10 and 11, detailed view of upper dog of vertical reciprocating sliding dog-carrying frame.
Fig. 12, a view of Fig. 9 with upper dog engaged, dotted lines showing the method in action of releasing lower dog when it is desired to release the carriage.

The dog $f'$, as has been heretofore described, is loosely pivoted to the lug $f^4$ on the rod $f^5$, and has the bifurcated arm $f^{15}$, Fig. 11, surrounding the rod $f^5$, by which means the dog $f'$ is rigid on the forward movement of the carrier, but is flexible in the opposite direction, and the operator can return the platen-carrier any desired distance of its travel.

Attached to the spring-actuated drum by means of the hollow shaft $i^2$ is the wheel I. On this shaft $i^2$ is loosely attached the adjustable spring bell-trip and drum-stop $i$, the wheel I having teeth or orifices $i^9$, the drum-stop $i$ having projection $i^4$, which trip and stop can be moved so as to rest in any desired tooth or orifice of the wheel I. The adjustable spring bell-trip and drum-stop performs the double function of operating the mechanism by which the bell is rung, as will hereinafter be described, and it also acts as a stop to any further movement of the spring-actuated drum at any desired point. In the construction here shown one element performs both these functions, yet each function, if desired, can be performed by separate elements without deviating from the invention, as shown in Fig. 17, in which the second element is marked $i^{19}$, in which case $i^{19}$ represents the drum-stop and $i$ the bell-trip. On the back of the main frame of the machine is attached the bell-operator $j$. Within the hollow shaft $i^2$ is the normally-idle shaft K, having fixedly attached to one end the arm $k$ and to the other end the spring-clapper $k'$ of the bell L and the stop $k^6$. The wheel I has upon it teeth or orifices equal in number to the number of letters the machine is capable of writing in the extreme limit of travel of the platen-carrier.

The adjustable spring bell-trip and drum-stop $i$ is placed in any desired tooth or orifice of the wheel I which will be at the proper position on the wheel to engage the bell-operator when the platen-carrier is at or near the extreme limit of its travel. When the wheel I is rotated by the spring-actuated drum, the adjustable spring bell-trip and drum-stop $i$ is carried with it until the projection $i^4$ on said stop $i$ strikes the projection $l'$ on the under side of the bell-operator $j$, which bell-operator normally rests against the arm $k$, the bell-operator $j$ being so situated that if it had no pin or projection on its under side the adjustable spring bell-trip and drum-stop $i$ would pass beyond the bell-operator $j$ without striking it. The striking of this projection $l'$ of the bell-operator $j$ causes the bell-operator $j$ and the arm $k$, against which it rests, to be carried with the adjustable spring bell-trip and drum-stop, causing the shaft K to rotate and the clapper to be drawn to the position for operation. As shown in dotted lines, Fig. 17, the bell-operator $j$ travels in the arc of a circle, which gradually departs from the arc of a circle in which the adjustable bell-trip and drum-stop $i$ travels, until the projection $l'$ is released from said trip, when the bell-clapper forces the arm $k$ back, carrying the bell-operator $j$ back with it to its normal position and ringing the bell. When it is desired to prevent any further motion at any point of travel of the drum, the adjustable lug M, having the projection $m$, (shown in Fig. 18,) is rigidly attached to the rim J, which rim is secured at the back of the main frame of the machine at any desired point by means of the screw $m'$, so that when the adjustable spring bell-trip and drum-stop $i$ in its travel strikes the projection $m$ the motion of the spring-actuated drum ceases until the adjustable spring bell-trip and drum-stop $i$ is returned back or the lug M removed. The adjustable spring bell-trip and drum-stop $i$ can be moved backward at will, pushing the bell-operator $j$ out of its way on its backward movement without disturbing the arm $k$.

When it is desired to prevent the drum from returning to its extreme initial point, a second lug M is placed on the opposite side of the rim. (See Fig. 17.) If the extreme limits of movement of the drum are used, no lugs will be necessary. When the platen-carrier has reached the desired limit of its travel in returning toward its initial position, the necessary line-spacing is accomplished in the following manner: A plunger, N, (shown in Figs. 14, 15, and 17, having the guide-pin $n$ (the pin $n$ may be dispensed with if the plunger N be made rectangular) to prevent its revolution, passes through the end of the platen-carrier D, also through the shaft of the ratchets O and O', preferably at the left-hand end, into the platen C, and has a spring, $n'$, in its inner end, which normally forces the plunger N outward by resting against the shoulder $n^3$ of the plunger.

At the end of and attached to the platen having the plunger are the ratchets O and O'. The ratchet O may be used alone, if desired; but the use of both ratchets O and O', said ratchets having a space between them, enables a greater width of paper to be used with any given size of platen.

The spring-pawl $o$ normally rests in the ratchet O', being attached to the platen-carrier frame by a screw. The pawl $o^2$ is attached to the platen-carrier of the machine and connected at its outer end with the plunger by means of the projection $o^3$ of the plunger, which projection travels in the cam-shaped slot $o^4$ on the end of the pawl $o^2$. At the inner end of the pawl $o^2$ is the spring-tooth $o^5$. When the operator in returning the platen-carrier toward its initial position presses in the plunger N, (which is preferably accomplished by resting the thumb on the thumb-piece $n^6$, shown in Figs. 1 and 17,) the projection $o^3$ travels in the cam-shaped slot $o^4$, acting upon the driving-pawl $o^2$, causing the spring-tooth $o^5$ to act upon the ratchet O, turning the platen, thus providing for the line-space. This distance may be adjusted by the stop P, pivoted on the platen-carrier frame, which will limit the throw of the pawl $o^2$ and movement of the platen. When the stop is pushed away, the plunger can be moved a greater distance, so as to cause the pawl $o^2$ to operate upon two teeth of the ratchet, turning the platen a double distance.

The stop and cam can be so constructed that three or more teeth of the ratchet may be acted upon by the driving-pawl by increasing the throw of the pawl $o^2$ and the movement of the plunger, or increasing the extent of the throw of the cam.

When the plunger is released, the spring $n'$ forces the plunger back to its normal position, carrying the pawl $o^2$, with its spring-tooth $o^5$, by means of the cam and projection $o^3$, back with it, and the spring of the spring-tooth $o^5$ enables the said tooth to slide over the teeth, the pawl $o$ preventing the platen from moving in the reverse direction.

The paper is held against the platen C by means of the pressure-roller $c$, and the desired pressure is obtained for this roller by means of the compression-springs $q$, Fig. 14, which are placed in recesses in the rear ends of the platen-carrier frame, pressing against the shaft of the pressure-roller at the points of its bearing.

In order to locate the printing-point at any portion of the platen-carrier and platen, a pointer, R, is flexibly attached to the main frame of the machine, Figs. 1 and 14. It is so connected therewith that when the portion E' of the main frame E is swung this pointer swings around so as almost to touch the paper on the exact line and point of impact, as shown in Fig. 14. The pointer R is provided with a set-screw $r$, (said set-screw being adjustable,) so that the pointer when swung around is prevented from touching the paper. The platen-carrier and platen is moved so that it arrives at the desired printing-point, the pointer being normally fixed at the impact point of the type. The main frame is then swung back to its position and the desired type registered, thus obviating the necessity of calculating or consulting the scale. The indicator S is connected to and travels with the platen-carrier, the outer end of the indicator pointing to the scale $s$, said scale being secured to the main frame and graded the desired number of indications equal in number to the letter-capacity of the machine. This scale and indicator are preferably constructed as shown in Figs. 19 or 19$^a$, or in such a manner that the indicated movement of the platen-carrier and platen can be read when the main frame is in its normal position, or when the portion E' of the main frame E is swung upward. When it is desired to locate the numerical position of one or more points on the paper, the portion E' of the main frame E is swung upward and the carrier moved so that the pointer R rests over the desired point, at which time the numbered position of the desired impact point or points on the carrier may be readily read from the scale, and thus two or more positions may be located without returning the main frame to its normal position.

The ribbon-spools are constructed in the ordinary well-known manner. The ribbon-spool is retained in its bearings by being held between the projection $t$ and the standard $t'$, Fig. 13, the projection $t$ being secured to the main frame of the machine, and is constructed in the manner shown in Fig. 22, so that the spring-bearing $t^2$ can have a lateral movement. The standard $t'$ is made rigidly a part of the main frame of the machine. The shaft $t^3$ of the ribbon-spool has tapering ends which fit into the bearings. By forcing this shaft and ribbon-spool laterally the spring-bearing $t^2$ moves outward and the ribbon-spool shafts and ratchet-wheels can be thus readily removed from the machine and returned to their positions whenever desired.

Figures 24, 25, 26, 27, 28:
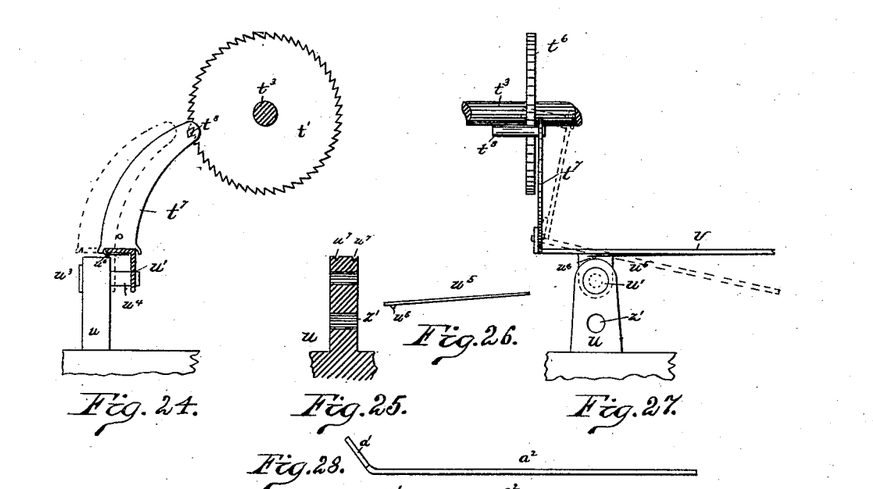
Fig. 24, side view of driving-pawl and ratchet-wheel of ribbon-spool.
Fig. 25, sectional view of main frame, showing means by which the ribbon-driving bar is locked in position.
Fig. 26, spring-lock of the ribbon-driving bar.
Fig. 27, end view of Fig. 24, showing movement of driving-pawl and mechanism for driving ribbon and shifting spring-lock.
Fig. 28, plan view of type-operating key.

The movement of the ribbon from one spool to the other is accomplished and controlled in the following manner: Attached to the shaft $t^3$ upon each of the ribbon-spools are the ratchet-wheels $t^6$. (Shown in Figs. 13 and 24.) Pawls $t^7$, having a toothed portion, $t^8$, rest in the ratchet-wheels. These pawls are attached at their lower ends to the ribbon-operating bar U. (Shown in Figs. 1 and 13.) This bar has a lip and this lip is pivoted on the standard $u$ at $u'$, Figs. 24 and 27, by the screw $u^3$, but has a lateral motion upon the portion $u^4$ of the screw $u^3$, as shown in Fig. 24, and is locked upon the standard $u$ by means of the spring-catch $u^5$. (Shown in Fig. 26.) A projection, $u^6$, on said spring-catch $u^5$ fits in the depressions $u^7$ in the standard $u$. As may be seen, the lateral movement of this bar U, according to the direction, causes the pawls corresponding to the ribbon-wheels to be alternately engaged or disengaged. This operating-bar U extends toward the front of the machine, Fig. 13, and is so situated that when the operator depresses any type-operating key both the vibratory spacing-frame and the ribbon-operating bar are forced downward, and the ribbon-operating bar, acting through its pivoted bearings upon the pawl, causes that ratchet-wheel which is connected with the pawl to be revolved, as shown in dotted lines, Fig. 27. The ribbon-operating bar can be adjusted, as heretofore described, so as to cause the engagement of either pawl directly with its corresponding ratchet-wheel.

The ribbon in its travel from one ribbon-spool to the other is guided and supported by means of the ribbon-supports 40, Figs. 13, 20, and 1. These ribbon-supports are constructed so that the ribbon rests upon them, and they are pivoted to the main frame in such a position as to hold the ribbon at its proper place at or near the point of impact of the type. When it is necessary to reach the working parts of the machine below the ribbon, the portion E' of the main frame of the machine is swung upward, and the pivoted ribbon-supports are also swung up, carrying with them the ribbon, if the machine is in operation. The ribbon-supports are placed adjacent to each of the spools and are preferably connected with each other. When the spacing-key A', heretofore described, is operated, it has no action upon the ribbon-operating bar, acting only upon the vibratory spacing-frame. The spring $u^9$ surrounds the standard $u^8$ and is attached to the main-frame E of the machine. When the ribbon-operating bar is pressed downward, it compresses the spring $u^9$, and when the ribbon-operating bar is released the spring, being in compression, forces it back to its normal position.

The type-bar $a^5$, as shown in Fig. 33, may have one or more type at its lower end. This type-bar swings on the pin $x$, which is riveted fast to the hanger $a^8$. This hanger $a^8$ has a circular-shaped guide, $x'$, Fig. 29, in which the type-bar swings, and is guided from its initial point of movement to its point of impact. The two walls $x^2$ of the hanger are held together by rivets or screws $x^3$.

When two or more type are used on each type-bar, it is necessary that the type on said bar which it is desired to operate shall come in such a position that it will impinge upon the platen at the proper point. This is accomplished in the following manner: The plates $b$ and $b'$ and the bar B (the hangers $a^8$ are rigidly attached to the bar B) are riveted together by posts Y, forming the vibratory key-board and type-bar-carrying frame Z'. These parts are rigidly connected with each other. This vibratory key-board and type-bar-carrying frame Z' is pivoted at its forward ends to the frame Z by the lugs $z^2$, and this frame Z is pivoted on its lower ends at $z'$ to the standards $u$ of the main frame E of the machine, Figs. 1, 13, 25, and 27. This frame Z' is sustained at its inner end by the standard $z^3$, a part of the main frame, to which standard the frame Z' is connected by the lever $z^4$ by the lug $z^2$, said lever being pivoted on the standard $z^3$ at $z^5$ by the screw $z^6$, Figs. 1 and 8. This frame Z' has a swinging movement on these pivotal points, heretofore described, which is controlled and operated in the following manner: The lever $z^4$ is extended downward a distance sufficient to give the desired extent of swinging movement to the frame Z'. The connecting-link $z^7$ is loosely riveted to the foot of said link $z^4$, the connecting-link having preferably a bifurcated jaw, $z^8$, in which the foot of the lever $z^4$ rests. The connecting-link $z^7$ extends a distance sufficient to give the desired movement to and from the printing-point. At the forward end of this connecting-link it is pivoted to the arm $z^9$ at $z^{10}$. This arm $z^9$ is pivoted to the main frame of the machine at a point, $z^{12}$, sufficiently distant from the pivotal point of the connecting-link $z^7$ to give the desired movement by the arm $z^9$. The arm $z^9$ has a forward and backward movement on the pivotal point $z^{12}$, which communicates, through the connecting-link $z^7$, a vibratory movement to the lever $z^4$ and causes the frame Z' to vibrate to and from the printing-point. The means by which this arm $z^9$ is caused to move backward and forward, also the means for regulating said movement, is as follows: The arm $z^9$ has a friction-wheel at its outer end, $z^{14}$. This wheel rests within the auxiliary frame $z^{15}$, made solid with the main frame. Attached to said auxiliary frame $z^{15}$ are the keys for operating the shifting mechanism. The wheel $z^{14}$ is normally prevented from rotating and the arm from acting by being held between the jaws $z^{16}$ of the sliding stop $z^{17}$, which stop has a vertical movement in the auxiliary frame $z^{15}$. In this frame are the two shifting-keys $z^{18}$, constructed as shown, Fig. 5, and these keys have a vertical movement in the frame $z^{15}$. The keys have a portion of their lower end cut out, leaving a projection, $z^{19}$, which rests on the top of a sliding stop, $z^{17}$, and its opposite edge has the projection $z^{20}$ in contact with the lug $z^{22}$ on the sliding stop and cam-shaped ends $z^{21}$. When one of the shifting-keys is depressed, the projections $z^{19}$ and $z^{20}$ force the sliding stop downward, releasing the friction-wheel and arm $z^{14}$ and $z^9$. The key $z^{18}$ is suspended in its frame a sufficient distance above the wheel $z^{14}$, so that in the downward movement of the shifting-key the arm $z^9$ is released from the sliding stop before the cam-shaped end strikes the wheel $z^{14}$ of the arm $z^9$. When the cam-shaped end of the shifting-key comes in contact with the wheel $z^{14}$, the arm $z^9$ is caused to move backward or forward on the pivotal point $z^{12}$, according to the direction of the cam-shaped end of said shifting-key. The sliding stop $z^{17}$ is retained in its normal position by the spring $z^{23}$, to which it is attached by the pin $z^{24}$, and its other end is attached to the adjusting-screw $z^{25}$ of the auxiliary frame $z^{15}$, by which the desired tension of the spring is obtained. This spring rests in the socket $z^{26}$ in the auxiliary frame of the machine. (See Figs. 2, 3, 4, and 13.) When the shifting-key is released after having shifted the frame Z', the spring $z^{23}$, being in tension, returns the sliding stop and the shifting-key to their normal position, and said spring $z^{23}$, aided by the spring $z^{29}$, Fig. 8, one end of which is attached to the main frame E and the other end to the bifurcated end $z^{28}$ of the arm $z^9$, forces the frame Z' back to its normal position. In order that when one shifting-key is operated the other is held in its normal position, a spring-button, $z^{27}$, is provided. Said spring-button $z^{27}$ rests in a detent, $z^{30}$, in the shifting-key $z^{18}$, which detent is so slight that while it holds either of the keys normally up while the other is acting a slight pressure will throw the spring-button $z^{27}$ out of the detent and allow the shifting-key to operate. When it is desired to hold the vibratory frame Z' in a shifted position, the spring-button $z^{27}$ may be forced into the detent $z^{31}$ of the key when said key has made its full necessary movement, and said detent is of sufficient depth to hold said key, the shifting-frame Z', and intermediate mechanism in a fixed position.

A portion of the main frame carrying the platen-carrier and platen, the platen or the platen-carrier may be shifted by substantially the same mechanism as that hereinbefore described; in which case the type-bar-carrying frame may be shifted, as hereinbefore described, or may be constructed so as to be rigid.

The subject-matter of a pivoted portion of the main frame is specifically reserved, as it forms the subject-matter of an application filed this day, said application being a divisional application of this application, said application being filed December 14, 1888, and serially numbered 293,634, and relates to pivoting a portion of the main frame to the remainder of said main frame.

I do not intend to claim the combination of a supplementary spring with the space-key lever and letter-space vibrating frame.

Having now fully described my invention, what I claim, and desire to protect by Letters Patent, is—

1. In a type-writing machine, a series of type-operating keys, each of said keys having two vertical arms, and a rod or bar connecting said arms, the inner of said arms standing radially.

2. In a type-writing machine, type-operating keys having two vertical arms, and a rod or bar connecting said vertical arms, and type-bars equal in number to said type-operating keys, and connected at their outer ends with said type-operating keys at the upper end of said inner vertical arms, said connecting rods or bars being parallel to each other.

3. In a type-writing machine, in combination, a type-operating key having two vertical arms, and a rod or bar connecting said arms, said inner vertical arm having a slot or orifice, a spring in said orifice, a plate, $b$, one end of said spring being attached to the plate $b$ and the other end to the type-operating key.

4. In a type-writing machine, in combination, a type-operating key having two vertical arms, and a rod or bar connecting said vertical arms, and a type-bar connected at its outer end with said type-operating key at the upper end of said inner vertical arm.

5. In a type-writing machine, in combination, a rack carrying carrier-operating frame, a rod (a portion of the main frame) upon which said rack carrying carrier-operating frame travels, a rack attached to said rack carrying carrier-operating frame, mechanism, substantially as described, to operate said rack, and a platen-carrier which travels on a rod independent of the rod upon which the rack carrying carrier-operating frame travels, and means, substantially as described, to provide contact between said platen-carrier and the rack carrying carrier-operating frame.

6. In a type-writing machine, in combination, a rack carrying carrier-operating frame, a rod, $g$, (a portion of the main frame,) upon which said rack carrying carrier-operating frame travels, a rack, fixed lugs on the main frame to guide said rack, a spring-actuated drum, and a gear of said spring-actuated drum into which said rack works, whereby when the spring-actuated drum operates the rack is driven forward and guided.

7. In a type-writing machine, in combination, a rack carrying carrier-operating frame which travels upon the main frame, a rack attached to said rack carrying carrier-operating frame, a main frame, a platen-carrier attached to said main frame so as to have only a lateral motion on said main frame, a portion of said main frame being pivoted, and a contact-arm connecting said platen-carrier and rack carrying carrier-operating frame in such a manner that contact is retained between them when the pivoted portion of the main frame is swung.

8. In combination, the vibrating spacing-frame and type-operating key having two vertical arms, and a rod or bar connecting said arms, said rod or bar projecting beyond said type-operating key a distance sufficient to rest above the outer end of said vibratory spacing-frame.

9. In the vertical reciprocating sliding frame of a type-writing machine, in combination, a rod in said frame, a spring upon said rod, a dog pivoted to said rod, a spring-actuated drum, and a ratchet upon said spring-actuated drum in which said pawl rests, whereby the pawl is rigid in one direction of movement of said drum, but presents no obstacle to the opposite movement of the drum.

10. In a type-writing machine, in combination, a spacing-frame and spacing mechanism, and an adjustable spacing-key.

11. In a type-writing machine, in combination, a spacing-frame, a spacing-key, and an extension-finger projecting from said spacing-frame to a point beneath said spacing-key.

12. In a type-writing machine, in combination, a spacing-frame, an adjustable spacing-key, the plates $b$ and $b'$, and orifices in said plates wherein the key rests and is secured.

13. In a type-writing machine, in combination, a spacing-frame, an adjustable spacing-key, the plates $b$ and $b'$, orifices in said plates wherein the key rests and is secured, and extension-fingers $a^6$, projecting from the end of said spacing-frame.

14. In a type-writing machine, in combination, a rack carrying carrier-operating frame which travels upon the main frame, a rack, said rack having slots and being connected through said slots with the rack carrying carrier-operating frame by screws or similar means, which screws hold the rack in a fixed position on the rack carrying carrier-operating frame when said screws are in position, but when said screws are withdrawn a small distance the rack may be moved up, and a gear on said spring-actuated drum in which said rack normally rests, whereby when said rack is moved up the rack is released from the gear of the spring-actuated drum.

15. In combination, a spacing-frame, and a reciprocating sliding frame having the dog $f^2$, said dog $f^2$ having a reciprocating sliding motion independent of and in a plane parallel to the movement of the reciprocating sliding frame.

16. In a type-writing machine, in combination, a reciprocating sliding frame, a dog, $f^2$, connected to said frame, a spring surrounding said dog and retaining it normally in its most extended position, and a lever, $f^{12}$, pivoted upon the main frame, the outer end of said lever being in path of movement of said reciprocating frame.

17. In a type-writing machine, in combination, a spacing-frame, a reciprocating sliding frame connected with said spacing-frame and provided with dogs $f'$ $f^2$, a lever, $f^{12}$, pivoted upon the main frame, a spring surrounding said dog $f^2$, a projection, $f^{30}$, on the reciprocating sliding frame, a spring-actuated drum, and a ratchet on said spring-actuated drum, in which said dog $f'$ normally rests, whereby, when the sliding frame is elevated beyond its normal movement, both dogs $f'$ $f^2$ are held free from the ratchet of said spring-actuated drum and the spring-actuated drum can revolve freely.

18. In a type-writing machine, in combination, a reciprocating sliding frame, dogs $f'$ and $f^2$, said dog $f^2$ being connected with said frame by a pin, said pin projecting beyond the frame, a spring surrounding said dog and retaining it normally in its most extended position, a lever, $f^{12}$, pivoted upon the main frame, a projection, $f^{30}$, on the reciprocating sliding frame, and a spacing-frame, whereby, when the spacing-frame is depressed the required distance, both dogs are released.

19. In a type-writing machine, the combination of an adjustable drum-stop and spring-actuated drum.

20. In a type-writing machine, in combination, a bell-trip, a spring-actuated drum, and a bell-operator and bell.

21. In a type-writing-machine, in combination, a bell-trip, a spring-actuated drum, a bell-operator, a loose shaft, an arm, $k$, of said shaft, a clapper, and a bell.

22. In a type-writing machine, the combination of an adjustable bell-trip and drum-stop with the bell and spring-actuated drum.

23. In a type-writing machine, in combination, an adjustable drum-stop, a spring-actuated drum, and a wheel revolving with said drum having teeth or orifices, in any of which teeth or orifices in said wheel said adjustable drum-stop may be placed.

24. In a type-writing machine, in combination, an adjustable bell-trip, a spring-actuated drum, and a wheel revolving with said drum having teeth or orifices, into any of which teeth or orifices in said wheel said adjustable trip may be placed.

25. In a type-writing machine, in combination, an adjustable bell-trip, a spring-actuated drum, a wheel revolving with said drum having teeth or orifices, into any of which orifices in said wheel said adjustable bell-trip may be placed, and said bell-trip having a projection, a bell-operator attached to the main frame, having a projection on its under side, a loose shaft, K, having an arm, $k$, and a bell and bell-clapper, whereby when the drum is moving in its forward motion and the adjustable bell-trip strikes the bell-operator the bell is rung, but on the return movement the adjustable bell-trip passes the bell-operator, but without affecting the arm $k$.

26. In a type-writing machine, the combination of the platen-carrier-actuating mechanism, a stop upon said platen-carrier-actuating mechanism, and a lug attached to the main frame, said stop and lug being relatively adjustable with respect to each other.

27. In a type-writing machine, in combination, a spring-actuated drum, an adjustable drum-stop, and an adjustable lug, M, secured to the main frame.

28. In a type-writing machine, in combination, a spring-actuated drum, an adjustable drum-stop, a rim, J, secured to the main frame, and adjustable lugs M, secured to said rim at the desired point.

29. In a type-writing machine, in combination, a platen-carrier, a platen, a plunger mounted upon and traveling with said platen-carrier, said plunger passing into said platen, and a driving-pawl.

30. In a type-writing machine, in combination, a platen-carrier, a platen, a plunger mounted upon and traveling with said platen-carrier, said plunger passing into said platen, and a driving-pawl, and a spring to return said plunger when it is forced into the platen.

31. In a type-writing machine, in combination, a platen-carrier, a platen, a plunger mounted upon and traveling with said platen-carrier, and a driving-pawl.

32. In a type-writing machine, in combination, a platen-carrier and platen, a plunger, a pawl attached to the platen-carrier frame, said pawl having a cam-shaped slot, a projection on the plunger which travels in said slot, a spring-tooth on the inner end of said pawl, a ratchet-wheel on the end of said platen, into which said pawl works, and a holding ratchet and pawl.

33. In a type-writing machine, in combination, a platen-carrier, a platen, a plunger, and a pawl having a cam-shaped slot.

34. In a type-writing machine, in combination, a platen-carrier, a platen, a plunger, a pawl having a cam-shaped slot and a spring-tooth at its inner end, and a ratchet-wheel on the end of said platen.

35. In a type-writing machine, in combination, a platen-carrier, a platen, and two ratchet-wheels having a space between them, a driving-pawl which works in one ratchet-wheel, and a holding-pawl which works in the other.

36. In a type-writing machine, in combination, a platen-carrier and platen, a main frame, a portion of the main frame being pivoted, and a pointer flexibly attached to the pivoted portion of the main frame.

37. In a type-writing machine, in combination, a platen-carrier, a platen, a main frame, a portion of said main frame being pivoted, and a flexible pointer attached to said pivoted portion of the main frame, said pointer being adjustable, whereby when the pivoted portion of the main frame is swung said pointer will also swing, but is prevented from resting on the platen at the point of impact of the type.

38. In a type-writing machine, in combination, a platen-carrier and platen, a main frame, a portion of said main frame being pivoted, and a pointer attached to said pivoted portion of the main frame.

39. In a type-writing machine, in combination, a platen-carrier having a double-pointed pointer fixedly attached to said carrier, a main frame, a portion of said main frame being pivoted, and a double-faced scale fixedly attached to the pivoted portion of the main frame.

40. In a type-writing machine, in combination, ribbon-spools, ratchet-wheels on the shafts of said spools, an independent ribbon-operating bar, driving-pawls on the ends of said bar adapted to operate either ratchet-wheel, and operating-keys which rest above the outer end of said ribbon-operating bar, said ribbon-operating bar being capable of movement across the machine.

41. In a type-writing machine, in combination, ribbon-spools, ratchet-wheels on the shafts of said spools, an independent ribbon-operating bar, pawls on the ends of said bar adapted to operate either of said ratchet-wheels, and a series of type-operating keys.

42. In a type-writing machine, in combination, ribbon-spools, ratchet-wheels on the shafts of said spools, an independent ribbon-operating bar, pawls on the inner ends of said bar adapted to operate either ratchet-wheel, type-operating keys having two vertical arms, and a rod or bar connecting said arms, said rods or bars projecting beyond said type-operating keys a distance sufficient to rest above the outer end of said ribbon-operating bar.

43. In a type-writing machine, in combination, ribbon-spools, ratchet-wheels on the shafts of said ribbon-spools, an independent ribbon-operating bar, and driving-pawls on the inner ends of said ribbon-operating bar, said bar being pivoted at or near its inner end and being capable of lateral motion across the machine, whereby the corresponding pawls are engaged with or disengaged from their ratchet-wheels.

44. In a type-writing machine, in combination, ribbon-spools, ratchet-wheels on the shafts of said ribbon-spools, an independent ribbon-operating bar, pawls on the inner ends of said ribbon-operating bar, said bar being pivoted at or near its inner ends and being capable of lateral motion across the machine, and a retaining-spring, whereby the ribbon-operating bar is held fixed in its different lateral positions.

45. In a type-writing machine, in combination, ribbon-spools, ratchet-wheels on the shafts of said spools, an independent ribbon-operating bar, and pawls at the ends of said bar adapted to operate either ratchet-wheel, and a spring attached to the main frame and resting under said ribbon-operating bar, against which said ribbon-operating bar works.

46. In a type-writing machine, in combination, a type-bar, a type-bar hanger, and a guide made integral with said type-bar hanger, said type-bar being attached to said hanger, so that said type-bar may have a swinging movement and be guided by said hanger in said movement.

47. In a type-writing machine, an inverted-L-shaped type-bar hanger having a quadrantal guide.

48. In combination, a type-bar hanger, a type-bar suspended therein, and a direct-operating key, said operating-key being below the point of suspension of the type-bar in the hanger.

49. In a type-writing machine, in combination, a series of type-bars, a series of operating-keys to operate said type-bars, a vibratory frame on which said operating-keys and type-bars are mounted, and a vibratory spacing-frame.

50. In a type-writing machine, in combination, a vibratory spacing-frame having its front and rear ends parallel, a series of operating-keys having two vertical arms, the inner arms standing radially and the outer arms arranged in arcs of circles, and rods or bars connecting said arms, and a vibratory frame on which said keys are mounted.

51. In the shifting mechanism of a type-writing machine, in combination, shifting-keys, a sliding stop, and connecting-arm.

52. In the shifting mechanism of a type-writing machine, in combination, a connecting-arm, a sliding stop in which said arm normally rests, a spring to hold said stop in and return it to its normal position, shifting-keys, said keys being adapted to rest on a projection on the sliding stop, and a cam-shaped end on said keys, whereby when the shifting-keys are operated the connecting-arm is released from the sliding stop and shifted.

53. In the shifting mechanism of a type-writing machine, in combination, a connecting-arm, a sliding stop in which said arm normally rests, and two shifting-keys, said keys being adapted to rest on the sliding stop, and opposite cam-shaped ends on said keys, whereby when one of the shifting-keys is operated the projection of the connecting-arm is released from the sliding stop, and according as to which shifting-key is operated the connecting-arm is shifted forward or backward.

54. In a type-writing machine, in combination, a vibratory type-bar-carrying frame, a lever to which said frame is pivoted, a connecting-arm, a link connecting said vibratory type-bar-carrying frame and said connecting-arm, a projection on the end of said arm, a sliding stop in which said projection normally rests, and shifting-keys, a projection on said keys which rests on a projection on the sliding stop, and cam-shaped ends on said keys, whereby when the shifting-keys are operated the projection of the connecting-arm is released from the sliding stop and the vibratory type-bar-carrying frame is shifted.

55. In a type-writing machine, in combination, a vibratory type-bar-carrying frame, a lever to which said frame is pivoted, a connecting-arm, a link connecting said vibratory type-bar-carrying frame and said connecting-arm, a projection on the end of said arm, a sliding stop in which said projection normally rests, and two shifting-keys, projections on the opposite sides of said keys which rest on a projection on the sliding stop, and opposite cam-shaped ends on said keys, whereby when one of said shifting-keys is operated the projection of the connecting-arm is released from the sliding stop, and according as to which shifting-key is operated the vibratory type-bar-carrying frame is shifted forward or backward.

56. In the shifting mechanism of a type-writing machine, in combination, a shifting-key, a frame in which said key operates, a spring-stop, and a detent in the operating-key in such a position that said stop rests in said detent when the key is out of operation, said detent being of limited extent sufficient to sustain the key at rest, but a slight movement of the key when operating forces it out of said detent, of such construction that when the key is operated upon the sliding stop the stop is forced out of said detent.

57. In the shifting mechanism of a type-writing machine, in combination, a shifting-key, a frame in which said key operates, a spring-stop, and a detent in the operating-key in such a position that said stop can be forced into said detent when the operating shifting-key has reached the limit of its travel, and it is held in such a position by said stop until released.

58. In the shifting mechanism of a type-writing machine, in combination, a connecting-arm, a vibratory frame, shifting-keys, a sliding stop in which said arm rests, and a spring-stop, whereby when one of the shifting-keys is operated the keys, the vibratory frame, and intermediate mechanism are held in a fixed position.

59. In a type-writing machine, in combination, a platen, ribbon-spools, shafts upon which said ribbon-spools rest, and intermediate supports for said ribbon between said ribbon-spools, said ribbon-supports being below said platen and pivoted to the main frame, so they can swing up on their pivoted supports toward the platen.

HENRY H. UNZ.

Witnesses:
WALTER T. BILYEN,
RICHD. S. CHILD, Jr.